(12) United States Patent
Beyerle

(10) Patent No.: US 7,135,688 B2
(45) Date of Patent: Nov. 14, 2006

(54) APPARATUS AND METHOD FOR THE DETECTION OF THE ENERGY OF IONIZING ELECTRO-MAGNETIC RADIATION

(75) Inventor: Albert Beyerle, Santa Barbara, CA (US)

(73) Assignee: Mirmar Sensor, L.L.C., Santa Barbara, CA (US)

( * ) Notice: Subject to any disclaimer, the term of this patent is extended or adjusted under 35 U.S.C. 154(b) by 194 days.

(21) Appl. No.: 10/857,207

(22) Filed: May 27, 2004

(65) Prior Publication Data

US 2005/0040334 A1 Feb. 24, 2005

Related U.S. Application Data

(60) Provisional application No. 60/474,792, filed on Jun. 2, 2003.

(51) Int. Cl.
*G01T 1/185* (2006.01)
*H01J 47/02* (2006.01)

(52) U.S. Cl. .................................... 250/382
(58) Field of Classification Search ............... 250/382
See application file for complete search history.

(56) References Cited

U.S. PATENT DOCUMENTS

RE30,644 E * 6/1981 Whetten et al. ......... 250/385.1
6,078,039 A * 6/2000 Lacy .................... 250/214 VT
6,207,958 B1 * 3/2001 Giakos ................... 250/385.1
6,331,705 B1 12/2001 Eisen et al.
6,437,325 B1 8/2002 Reilly et al.
6,486,468 B1 * 11/2002 Lacy ......................... 250/282

OTHER PUBLICATIONS

Bolotnikov, A. et al. "Dual-Anode High-Pressure Xenon Cylindrical Ionization Chamber." IEEE Trans. on Nuclear Science, vol. 51, No. 3 (Jun. 2004), pp. 1262-1269.*
Dmitrenko, V.V. et al. "Vibrostability of High Pressure Xenon Gamma-Ray Detectors." IEEE Trans. on Nuclear Science, vol. 47, No. 3 (Jun. 2000), pp. 939-943.*
Tepper, G. et al. "High Pressure Xenon Gamma-Ray Spectrometers: Recent Developments and Applications." Proceedings of the SPIE—The International Society for Optical Engineering, vol. 3768 (Jul. 1999), pp. 261-270.*

* cited by examiner

*Primary Examiner*—David Porta
*Assistant Examiner*—Frederick F. Rosenberger
(74) *Attorney, Agent, or Firm*—Felix L. Fischer

(57) ABSTRACT

A spectrometer system employs a gridless Xenon detector having an anode and a cathode supported in spaced relation from the anode devoid of structure intermediate the anode and cathode. Pulses resulting from charge collection due to radiation ionization of the Xenon gas are detected and parametrized by a computation engine through multiple detected pulses. Simultaneous determination of the position and ionization energy allows selective presentation of the data to compensate for various position dependent phenomena.

11 Claims, 17 Drawing Sheets

APPARATUS AND METHOD FOR THE DETECTION OF THE ENERGY OF IONIZING ELECTRO-MAGNETIC RADIATION

CROSS-REFERENCE TO RELATED APPLICATIONS

This application claims priority of the Provisional Application Ser. No. 60/474,792 of the same title filed on Jun. 2, 2003.

REFERENCE TO COMPUTER PROGRAM CD

This application includes as an appendix a CD providing a source code written in IGOR Pro for a computer program incorporating the source code elements of an exemplary embodiment of the present invention as disclosed herein. The materials contained on the CD are incorporated by reference as though fully set forth herein. The program provided is copyrighted and no express or implied release of rights through its listing herein is contemplated

BACKGROUND OF THE INVENTION

1. Field of the Invention

This invention relates generally to the field of measuring the energy of ionizing electromagnetic radiation and, more particularly, to a vibration resistant high pressure xenon detector for such measurement.

2. Description of the Related Art

There are many fields in which the measurement of the energy of ionizing electromagnetic radiation such as gamma-radiation or X-radiation is desired. For the purposes of this application, the energy of ionizing electromagnetic radiation is equivalent to or a function of the wavelength or frequency of the radiation. Devices to accomplish this measurement are generally referred to as spectrometers. Spectrometry of electromagnetic radiation is a common method of determining the composition of the material from which the radiation emanated. Specifically, gamma-ray spectroscopy will determine the elemental composition of the material from which it emanates. X-Ray spectroscopy will determine the elemental or chemical composition of the material from which it emanates.

Gamma-ray spectrometry is important in all areas of nuclear measurement where gamma-ray energy must be measured or an isotope must be identified. Nuclear reactions or atomic transitions produce gamma-rays or X-rays whose energy identifies the interaction and the constituents in the reaction. Gamma-ray spectrometers typically consist of scintillators (see e.g. Radiation Detection and Measurement, Glenn Knoll, 3rd Ed., pp 219–264) which emit light whose intensity is proportional to the number of electrons ionized in the scintillating material by the gamma ray, semiconductors diode devices (Knoll at 353–404) in which the charge collected is proportional to the number of electrons ionized by a gamma-ray, or a gas-filled device whose charge is proportional to the number of electrons ionized (Knoll at 159–200). Geiger counters are gas-filled detectors whose charge collected is not proportional to the number of electrons ionized, hence are not spectrometers in the current art.

For the purposes of gas-filled spectrometers with which this invention deals, a radiation event occurs within the gas filled chamber when a single gamma ray or single X-ray interacts inside the gas in the chamber within or in proximity to an electro-magnetic field. This event strips off electrons from the gas within the chamber thus creating one or more ions (an ionization event—one radiation event can and usually does create more than one ionization event). The actual physical location of the point where an electron is stripped off is called the "interaction position" which is of importance in determining the spectroscopic information which will be further discussed below. The combination of the influences of all free electrons and ions form a single event which creates the pulse waveform time series influence on the electro-magnetic field.

Gas-filled spectrometers presently suffer from a shortcoming in that the apparent charge collected on the electrodes is dependent on interaction position. (Technically, this is the mirror-charge induced on the electrodes by the motion of the charged particles in the electric field needed to keep the electrodes at their fixed potential—this will be referred to as "collection" as is common in the art.) This "collection" results in a charge induced on the electrodes as the electric charge moves under the influence of the electro-magnetic field. As the charge is induced over time it produces a time series pulse.

As stated above, gamma-rays create electron-ion pairs in the gas. These electron-ion pairs are then counted to determine gamma-ray energy. In a gas, ionized by electromagnetic radiation, ions move much more slowly than the electrons. This leads to a position dependence in apparent charge collected, since the ions are not observed to move or be "collected" on the time scale in which the electrons are observed to move. In other words, the influence the ionization of an atom on an electro-magnetic field is dependant upon and in part a function of the distance of the interaction position from the electrodes that create the electro-magnetic field. This results in two unknown quantities: the energy deposited by the ionizing radiation and the location of the interaction position. Simple measurement of the resulting magnitude of change in the charge of the electrodes is inadequate for spectrometry purposes.

This problem is circumvented in three main ways in the current art. 1) Gas-filled proportional counters are spectrometers by virtue of the fact that they remove the position dependence by electron multiplication near the charge collecting electrode (the anode), so that the observed difference in collection with position is negligible. Any gain element sufficiently near the anode will accomplish this task. 2) Gridded ion chambers solve this problem by limiting the drift distance over which the electrons are observed, by a screening grid, called a Frisch grid. A spectrometer incorporating a Frisch grid is shown in FIG. 1. 3) It has been suggested that a "Luke grid" (See U.S. Pat. No. 5,530,249) could be constructed in which the electron charge is mainly measured by a set of interlocked grids in semiconductor detectors.

The preferred method of addressing this problem in the current state of the art for gas detectors is through the use of a Frisch grid. A current design detector employing a Frisch grid is shown in FIG. 1 wherein an anode 100 is supported within a cylindrical cathode 102. The grid 104 is supported around the anode and a ceramic feed through 106 allows signal transmission from the anode. The Frisch grid is a source of added mechanical complexity and additional electronic noise caused by its capacitance and its microphonic vibration.

It is therefore desirable that spectrometry is performed in the apparatus and the spectroscopic information is extracted from the apparatus in a way that enhances accuracy and reliability.

It is also desirable that a gas spectrometer be provided that is more reliable and sensitive while having greatly reduced sensitivity to mechanical vibration.

SUMMARY OF THE INVENTION

A spectrometer system according to the present invention employs a gridless Xenon detector having a pressure vessel containing high pressure Xenon gas, an anode supported within the pressure vessel and a cathode supported in spaced relation from the anode devoid of structure intermediate the anode and cathode. An electric field is created between the anode and cathode and maintained at a fixed potential using a preamplifier electrically connected to the anode and cathode. Pulses from the preamplifier resulting from charge collection due to radiation ionization of the Xenon gas are detected and a computation engine connected to the detecting means stores multiple detected pulses. A curve fitting routine operates on the stored data for fitting a curve to each detected pulse to create a fitted waveform. The fitted waveforms are then stored and categorized to create histogram data. The histogram data is then integrated to provide radiation energy data.

The present invention simultaneously determines the position and ionization energy rather than eliminating the position dependence as required in the prior art. The detector output waveform is recorded as a time series. The waveform is the result of several variables including interaction position (or alternatively pulse rise time as functionally related) and the ionization energy of the radiation. The anode and cathode radii and the electron velocity are physical parameters of the detector that can be employed in the analysis. By comparing the actual detector waveform to a model of the pulse (i.e. an equation for the time series) the variables defining the pulse can be simultaneously extracted by simultaneous determination of variables using a selected technique such as least squares fit.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
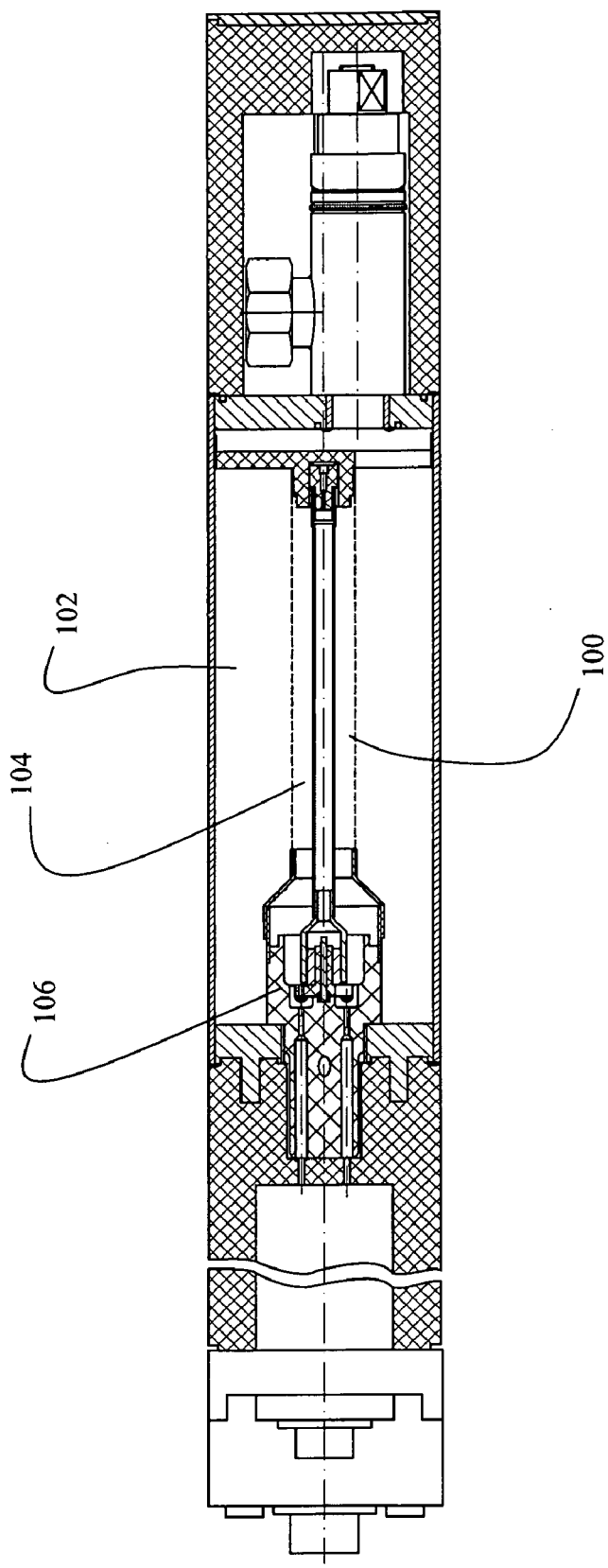
FIG. 1 demonstrates a prior art spectrometer using a Frisch grid.
Figure 2:
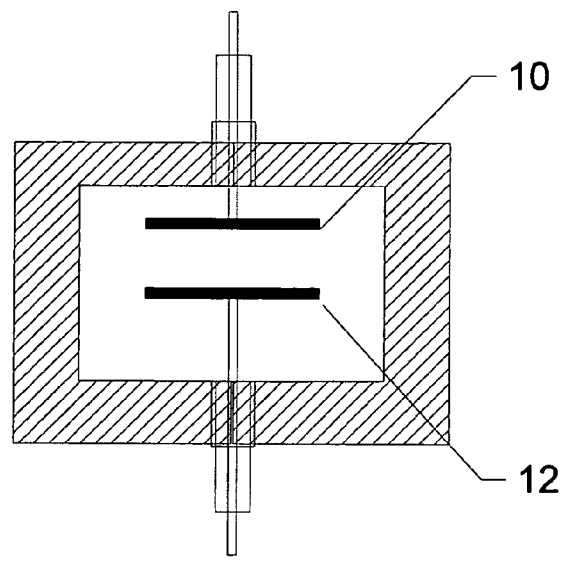
FIG. 2 is an exemplary embodiment of the present invention with a planar format.
Figure 3:
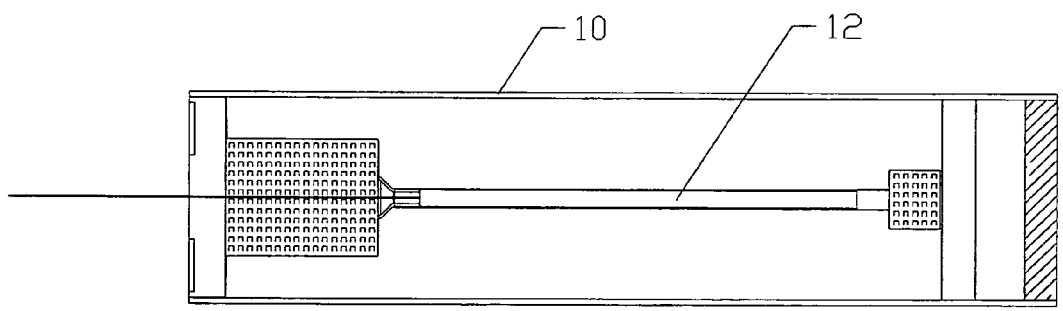
FIG. 3 is an exemplary embodiment of the present invention with a cylindrical format.
Figure 4:
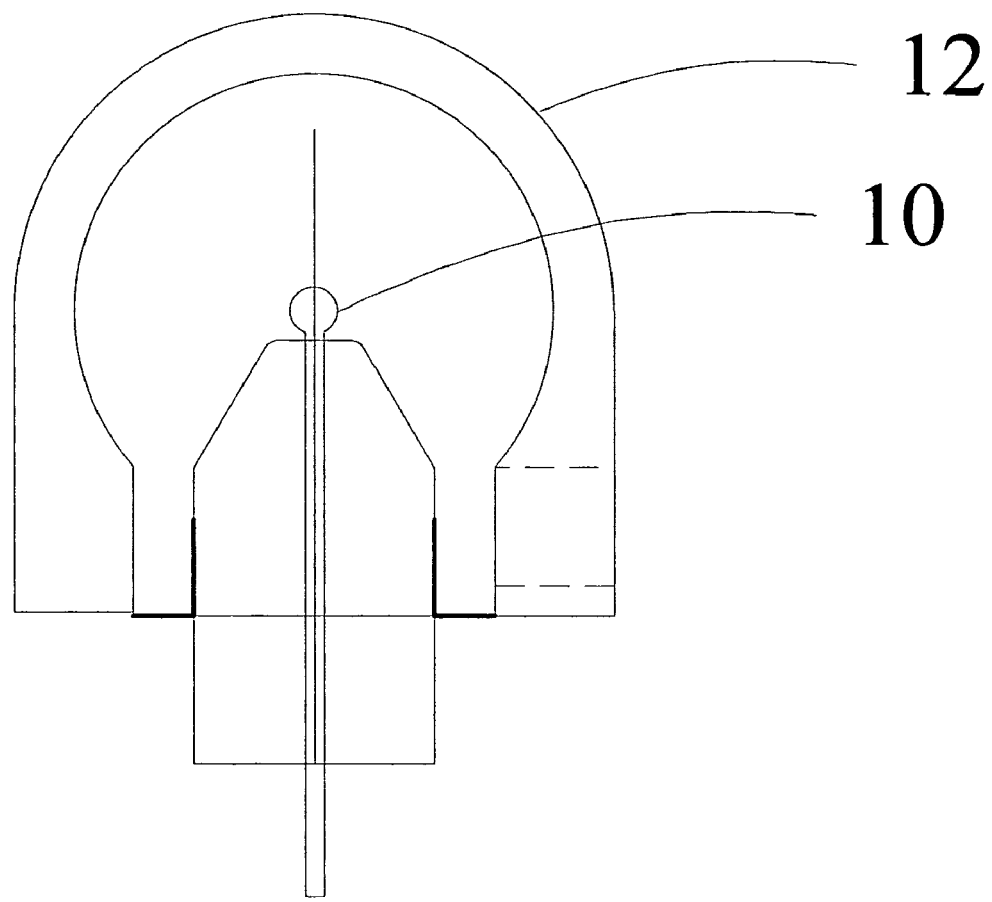
FIG. 4 is an exemplary embodiment of the present invention with a spherical format.

Referring to the drawings, FIGS. 2, 3 and 4 represent three geometrical embodiments of the present invention, but are not intended to be exclusive—the number of geometric configurations that would be suitable for use of the invention is virtually unlimited. In each of the embodiments, a negative voltage is applied on the cathode 10 with respect to the anode 12, and ionized electron—ion pairs are swept by the electric field toward the anode, inducing a charge on the anode. In each case, the apparent charge collected is dependent on the distance from the anode, but not on the lateral position from the anode. In each case, the charge collection time sequence will have a functional dependence on the number of electron-ion pairs and on the distance from the anode. And in each case, the information about both that distance and the number of electron-ion pairs is extracted from the pulse shape by an analyzer 14.

The planar embodiment of FIG. 2 has a planar cathode and planar anode separated by some distance filled with active gas. The cylindrical embodiment of FIG. 3 employs concentric cylindrical anode and cathode with the space between them filled with active gas. The spherical embodiment of FIG. 4 employs concentric spheres with the space between them filled with active gas. Although the cathode is shown to be larger than the anode in each figure, this is not a requirement.

Figure 5:
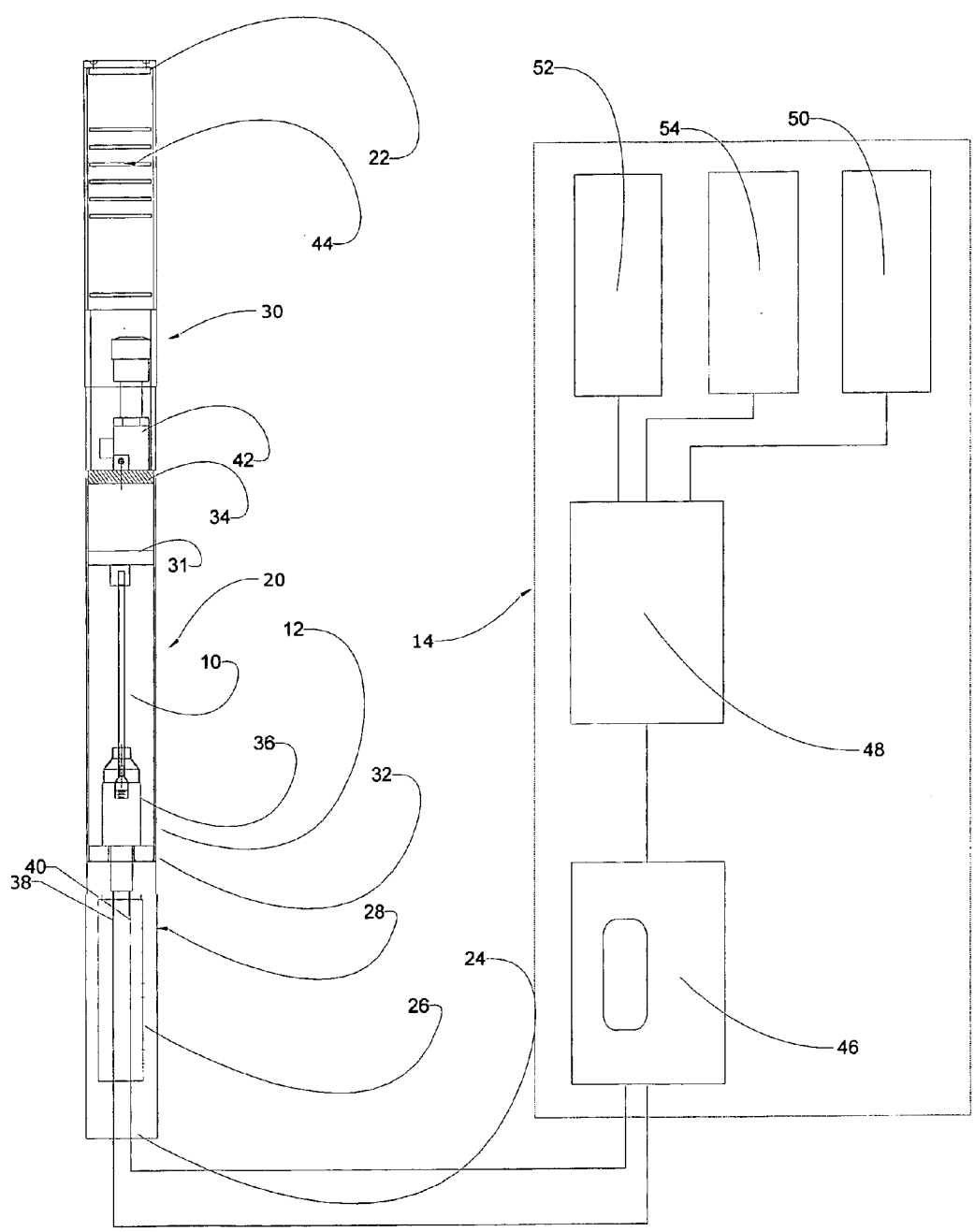
FIG. 5 is a detailed section view of an exemplary physical embodiment of the invention using the cylindrical format with oscilloscope and computer elements of the combination comprising the invention shown in schematic form.

FIG. 5 provides a detailed example of an embodiment of the invention in the cylindrical format for a xenon gas detector. The components of the detector 20 are carried between a head plate 22 and a base plate 24. A preamplifier 26 is mounted adjacent the base plate and, for the embodiment shown, is carried in an enclosure 28 extending from the base plate. A pressure vessel 30 extends between a pressure vessel base plate 32 and a pressure vessel head plate 31. Xenon gas is contained within the vessel at 0.3–0.7 g/cm$^3$. The anode 10 is supported between a base ceramic 34 and a ceramic feed through 36, which will be described in greater detail subsequently.

The cathode 12 is cylindrical and extends from the pressure vessel head plate to the pressure vessel base plate, insulated from the anode by the base ceramic and ceramic feed through. Signal leads 38 and 40 for the anode and cathode, respectively, extend from the ceramic feed through into the preamplifier enclosure for connection to the preamplifier.

Significant advantages are gained by elimination of any grid from the detector through reduction of capacitance and leakage current which impact the noise and vibration sensitivity of the detector.

A valve 42 is carried by the pressure vessel base plate and communicates with the interior of the pressure vessel. A reliable ultra-high vacuum closure is required for the xenon detector application and a valve comparable to the COTS valve produced by NUPro has been demonstrated to provide sufficient capability for the system. A high voltage power supply 44 is carried by the base plate for powering the detector.

The preamplifier provides the signal from the electrodes to an oscilloscope 46 for detecting and recording the pulses from Gamma ray ionization events collected by the electrodes. An output of the oscilloscope is provided to a computer 48 having a storage system 50 including a magnetic disc or comparable storage device and output devices such as a monitor 52 and printer 54 for graphical output of the spectrographic data and interim processing data as will be described subsequently.

Figure 6:
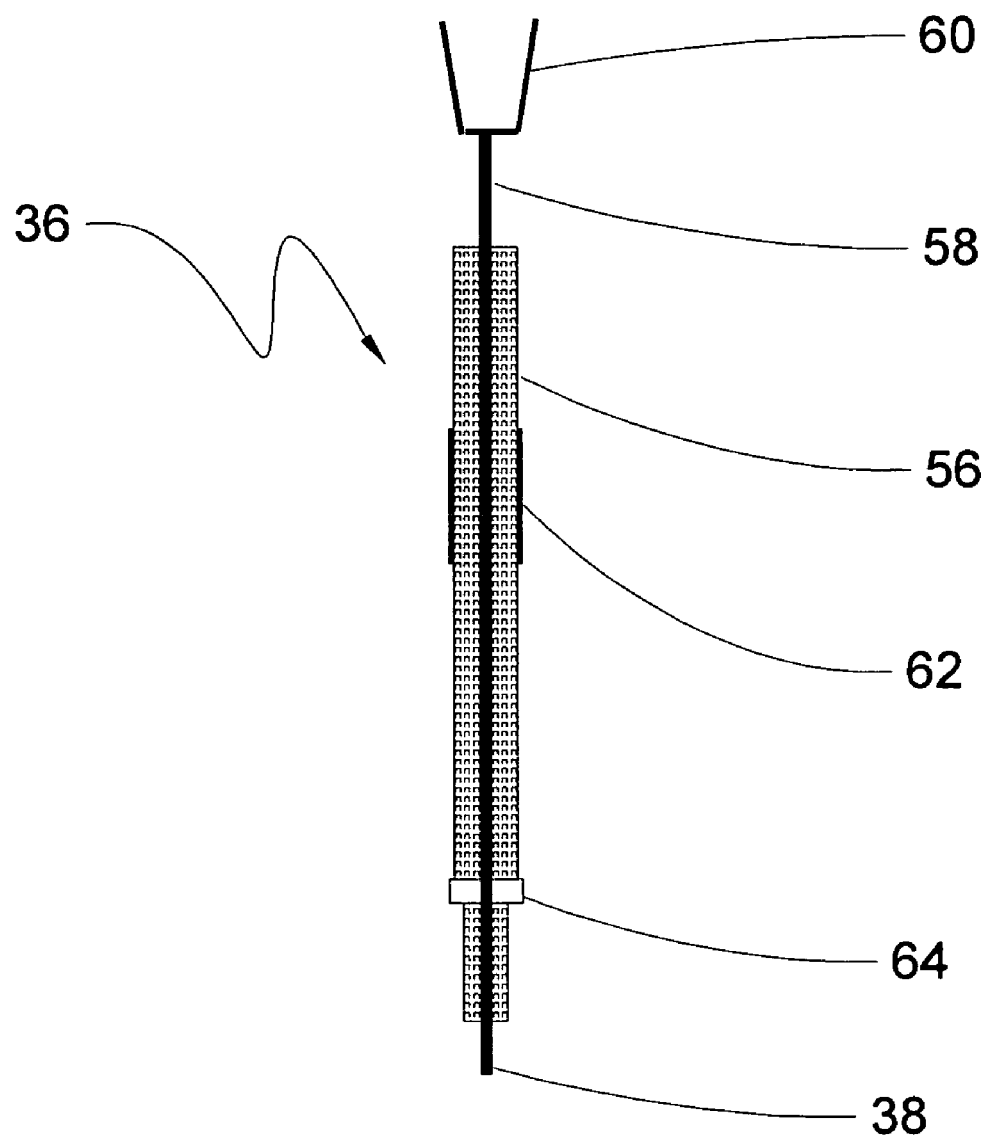
FIG. 6 is a section view of an embodiment of the ceramic feed through applicable for the embodiment of FIG. 5.

Details of an embodiment of the feed through 36 for the invention are shown in FIG. 6. A ceramic cylinder 56 carries the anode conductor 58 which attaches to the anode with a mechanical fitting 60 and extends to the signal lead 38. A braze ring 62 provides an attachment point for the cathode. A ground ring 64 provides a ground reference for the signal.

Figures 7A, 7B:
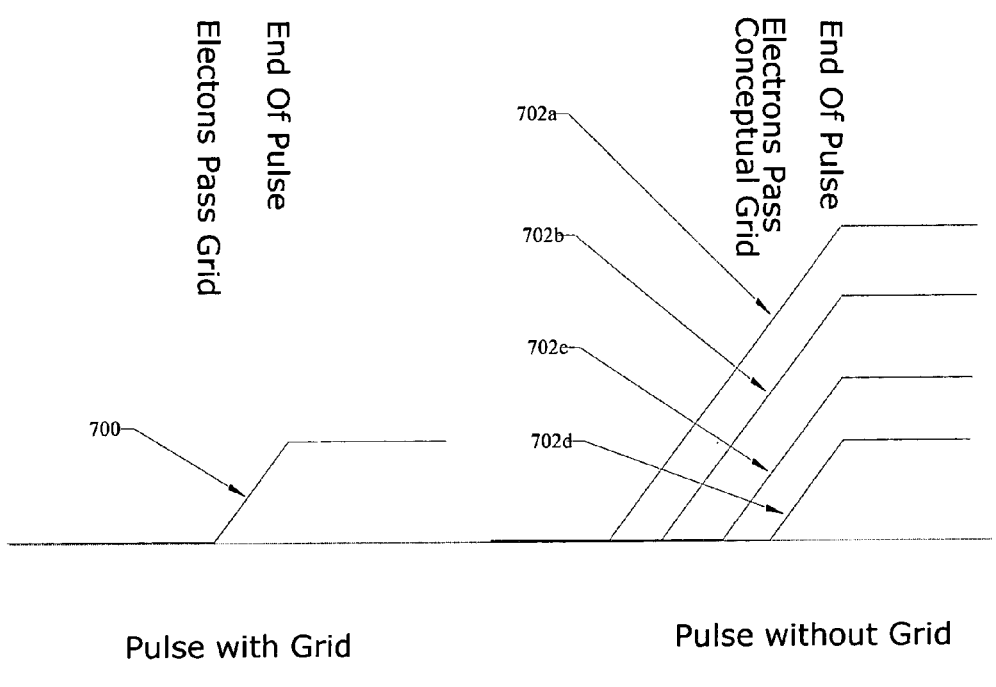
FIG. 7 is a graphical representation of the pulses received at the anode in the present invention compared to the prior art Frisch grid implementation.

Ionization events are captured by the detector when radiation ionizes the Xenon gas within the pressure vessel causing charge collection by the electrodes. Since no intermediate grid is present for distance correction, the signal pulse from the event may take several forms such as charge clouds from multiple interaction points shown in FIG. 7 where a grid corrected pulse 700 is shown on the left side of the figure and the multiple pulses 702a–d created by events of differing distance are shown on the right side of the figure.

In this example simplified using a planar embodiment of the invention, the pulses are linear with the slope of the charge pulse proportional to the energy. In the figure, four ionization events are shown by 702a–d. They all have the same slope (induced by the same number of electrons ionized) but different durations due to differing interaction positions. With a detector employing a Frisch grid all four pulses are identical and have the same amplitude. Therefore, the physical construct of the Frisch grid has eliminated the interaction position dependence on the pulse. Measurement of the number of electron-ion pairs is merely the measurement of the amplitude of the waveform. Without the Frisch grid the amplitude is not a measure of the number of electron-ion pairs. Digital analysis of the entire pulse waveform can extract the amplitude by simultaneous determination of both interaction position and the number of electrons. The present invention removes the devices to correct for the position dependence (i.e. the Frisch grid) allowing the position dependence to be determined and removed by mathematical (rather than mechanical) means.

By digitizing the amplitude of the charge pulse versus time on a sufficiently fast time scale (approximately 10–100 times faster that the transit time) the energy information can be extracted (or corrected for) by analysis with an external signal processor operating on the charge collection signal. Possible implementations of the digital processing include a mathematical fit (such as a least squares fit) to the charge pulse to the function derived from the Hecht relation to simultaneously extract position and amplitude.

Analysis of the entire waveform allows fitting of a mathematical function for the separation of the number of electron-ion pairs (which is proportional to the energy of the radiation) from the interaction position and deriving both pieces of information from each waveform. This technique works in any geometry having a regular calculable electric field, including but not limited to the planar, cylindrical and spherical node to cathode geometries disclosed herein.

For an exemplary embodiment, the pulses are acquired from the preamplifier with a Tektronix TDS 410 60 MhZ oscilloscope and read into a into a PC type computer.

Figure 8:
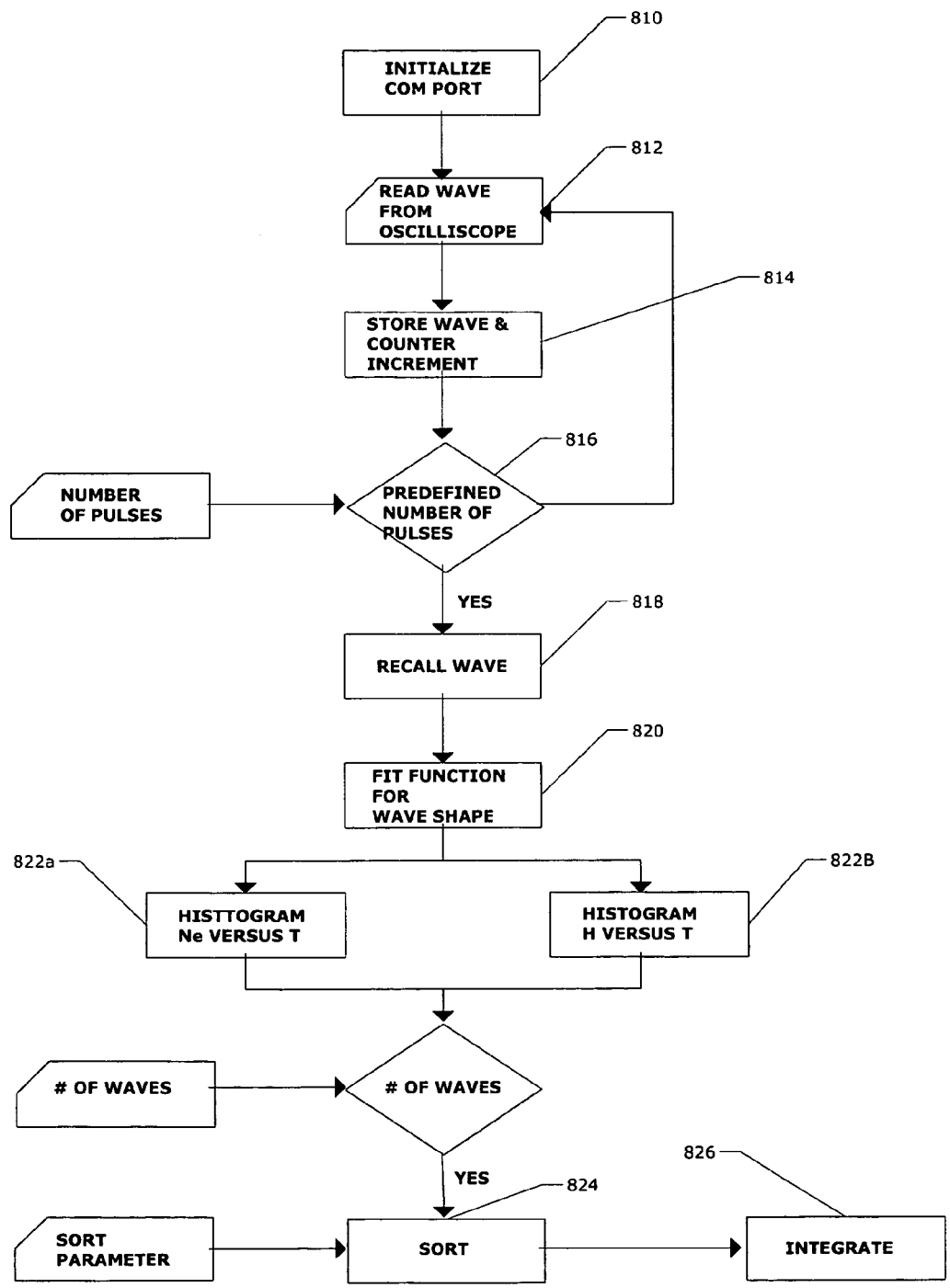
FIG. 8 a flow chart of one embodiment of an algorithm for signal processing of the pulses received to resolve the distance and energy of the electrons resulting from an ionization event.
Figure 9A:
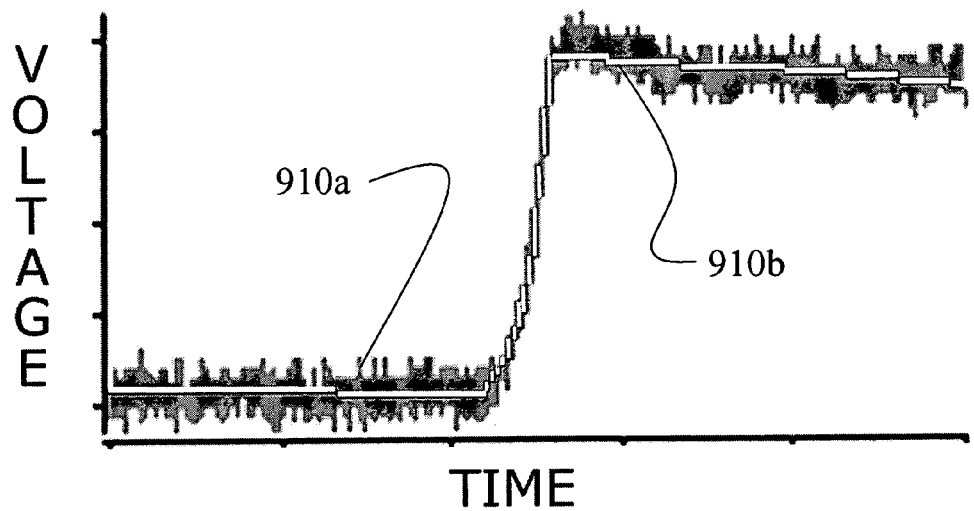
FIGS. 9a–f are graphs of pulse traces with resulting curve fits.
Figure 9B:
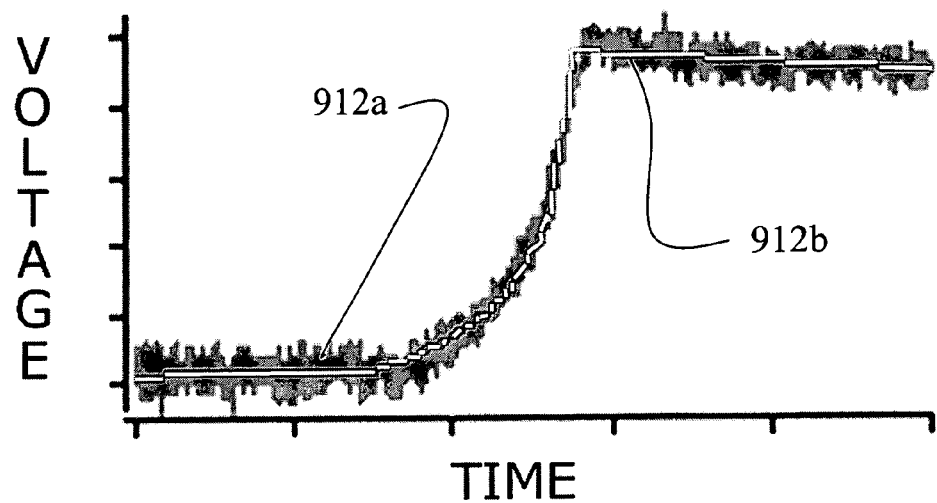
Figure 9C:
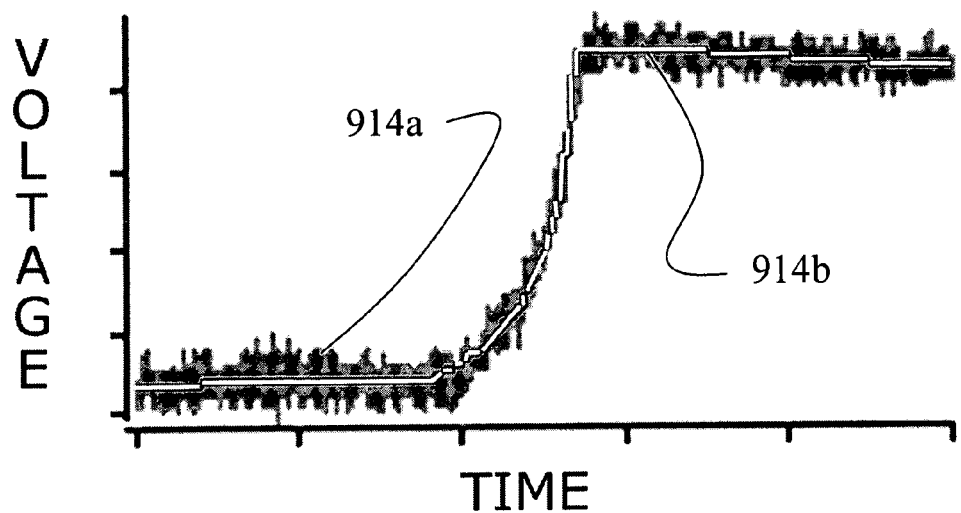
Figure 9D:
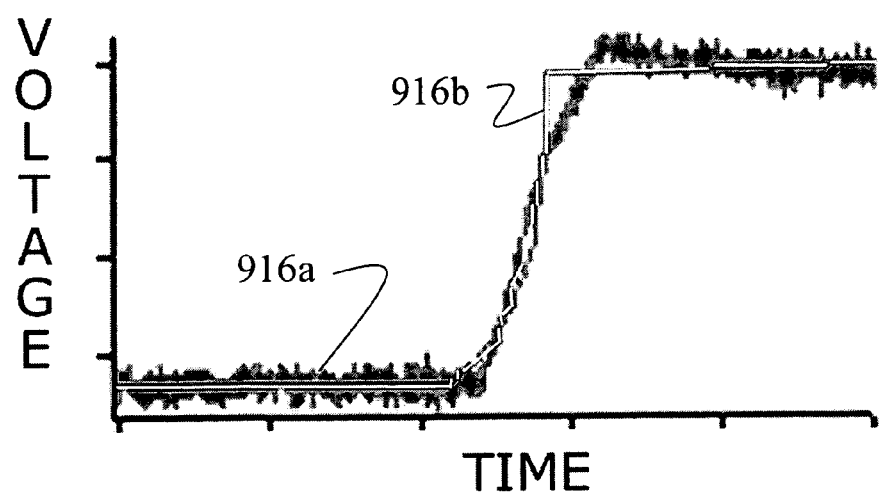
Figure 9E:
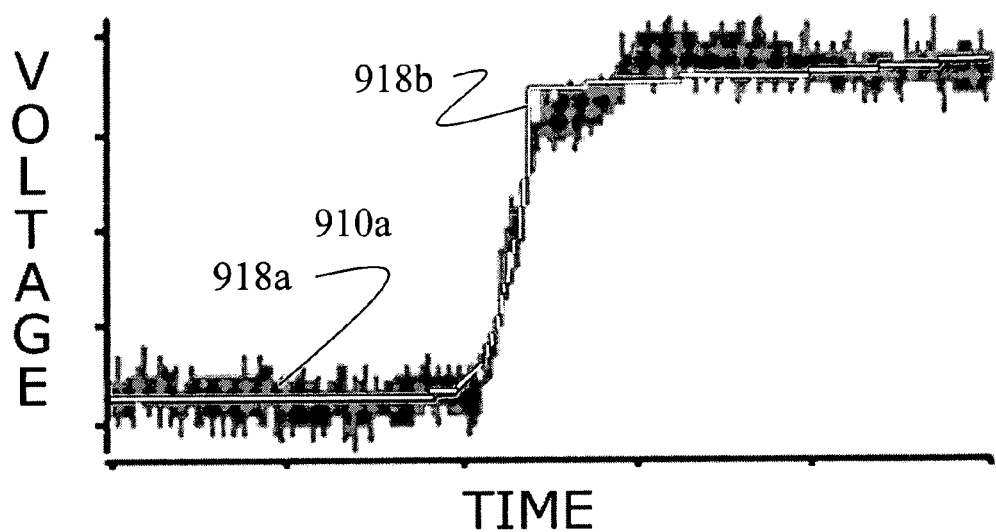
Figure 9F:
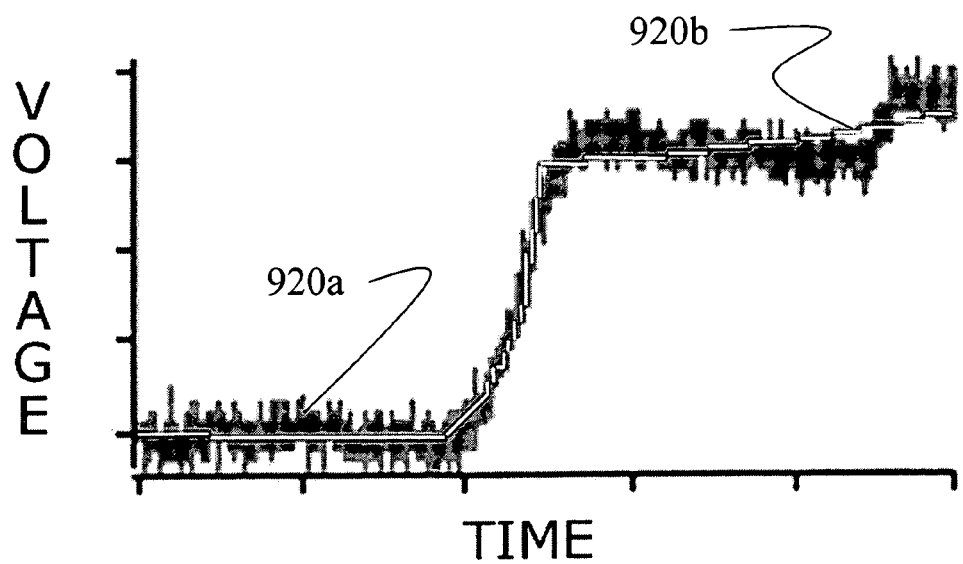

The input signal is analyzed employing software performing the steps shown in FIG. 8. A communications port connected to the oscilloscope is initialized 810 for pulse acquisition. A wave is then read 812 from the oscilloscope. For the embodiment shown, a file counter is then incremented 814 to allow sequential storage of the acquired waves. The pulse acquisition and storage is repeated for a predefined number of pulses 816. The stored waveforms are then recalled from memory 818, a fit function performed 820 on each waveform and the fitted waveform is then added to a histogram file 822a or 822b. Two histogram files are available in the present embodiment for the fitted waveforms, number of electrons versus rise time or the height of the pulse step versus rise time.

An example of code to accomplish the fit step is shown in Table 1 wherein the variables in the fit are a0, a1, a2, Ne, startpoint and endpoint where:
a0, a1, a2 are the quadratic background coefficients
Ne is the number of electrons
startpoint and endpoint are the starting and ending times of the pulse from which rise time is derived.

These variables are determined for the pulse waveform. The known physical parameters of the detector are Ra and V
Ra is the fixed radius of the anode
V is the electron velocity. V is determined empirically for each detector. A simple constant for V works to the first order although the actual V may be more complicated as described in Scaling Law for Electron Transport Coefficients in Mixture Xe+H2 with Various Concentrations of Molecular Impurities, V. M. Atrazhev, I. V. Chemysheva. E. V. Davydovskaya. V. V. Dmitrenko, Z. M. Uteshev, Proceedings of the International Seminar: "High Pressure Xenon: Fundamental Research, Detectors and Their Application" 2003 pp 200–201, ISBN 5-7262-0470-0

TABLE 1

```
variable result
variable transit_time
variable ra=0.4
if (x < startpoint)
result = a0 + a1*x + a2 * x * x + Ne * ln(1+V*(endpointstartpoint)/ra)
else
if (x < endpoint)
result = a0 + a1 * x + a2 *x*x + Ne * ln(1+V*(endpointx)/ra)
else
result = a0 + a1 * x + a2 *x*x
endif
endif
transit_time =startpoint – endpoint
f(x) = result
```

The triggered waves are fit with a function of constant electron velocity and cylindrically symmetric field. The fit is a function of 6 parameters. Three are a quadratic baseline, which is fit throughout the entire region. Superimposed on this background is the detector ramp function. This is a function of the number of electrons inducing the pulse, the start time of the pulse, and the end time of the pulse. Each pulse fits (typically) in 5–20 iterations which takes 2–3 seconds and each result can be shown on the computer monitor and/or printed.

FIG. 9 shows a variety of pulse shapes using a $^{137}$Cs source. The raw data designated as "a" in the graphed pair is the digitized pulse and the line designated "b" is the fit that the fit routine previously described with respect to Table 1 produces for each pulse. The first row of curve fits 910a and b, 912a and b, 914a and b contains all fairly normal pulses. The second row 916a and b, 918a and b and 920a and b contains three multiple events. Curves 916a and 918a are probably multiple Compton events from the same gamma-ray, while curve 920a shows multiple events which are separated in time so far that they must be from separate gamma-rays (pile-up). Various pulse shapes have the classic shape corresponding to the logarithmic electric field in the detector (910b, 912b and 914b). Many pulses have a rounded edge at the top (910b). These pulses are presumably electron clouds caused by a single gamma-ray interaction with a large radial distribution of the electron cloud. The extent of this rounding varies with the pulse. The rounding leads to a large deviation in the fit at the end of the pulse created by the fitting algorithm's need to optimize the deviation through the entire pulse.

Many pulses are modified by multiple events. Pulses 916a, 918a and 920a are examples of such pulses. While is impossible to tell what interaction caused a particular gamma-ray pulse, it is likely that events d and e are multiple interaction radii of a single gamma-ray at a single time. Event 920a is clearly distinct events from two separate gamma-rays. For the embodiment shown, a fit is accomplished for a single interaction radius and energy to the pulse. In fitting the pulse shape to multiple events, gamma-ray energy and interaction radii for each event are solved for in alternative embodiments. Events with non-physical radii combinations can be rejected. Clearly event 920a is not multiple interaction locations from a single gamma ray that occurred at one time, because the first electron cloud has stopped (was completely "collected") before the second cloud is created. Using the interaction positions from the fit, it is possible to sensitively detect "pile-up" events. Using a standard Gaussian shaping amplifier, the pulses must be clearly separated before they can be rejected by a pile-up rejection routine. By fitting each pulse individually, events with very small separation can be rejected and events with significant separation can be saved and analyzed as two pulses. The fitting function gives an estimate for the error of every pulse fit. The error of fitting several typical pulses are shown in Table 2, below. The average error is 1.5%. This is completely consistent with the electronics error (pulser resolution of about 10 keV; 1.5%) for the components of the embodiment described herein.

TABLE 2

| Error | Amplitude | % error |
|-------|-----------|---------|
| .118  | 8.732     | 1.35    |
| .132  | 8.372     | 1.58    |
| .119  | 12.315    | 0.97    |
| .285* | 12.298    | 2.32    |
| .119  | 8.466     | 1.40    |
|       |           | Average 1.52 |

*this pulse is a multiple event/Compton pulse.

Returning to the description with respect to FIG. 8, the histogram files created from the fitted pulses as either frequency at a certain type of gamma-ray event versus rise time versus the number of electrons or frequency versus rise time versus pulse step height or amplitude are printable to the monitor or printer. FIGS. 10a through 10d graphically depict the histograms created.

Figure 10A:
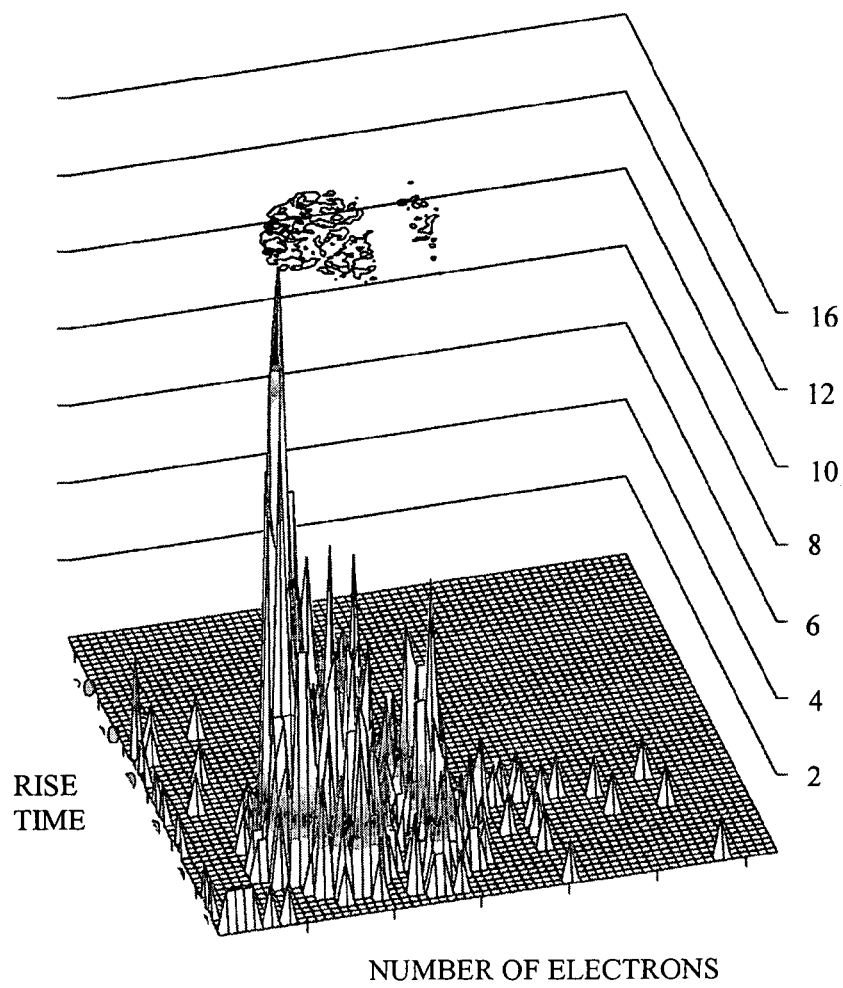
FIGS. 10a–d are graphical depictions of the histograms from an event.
Figure 10B:
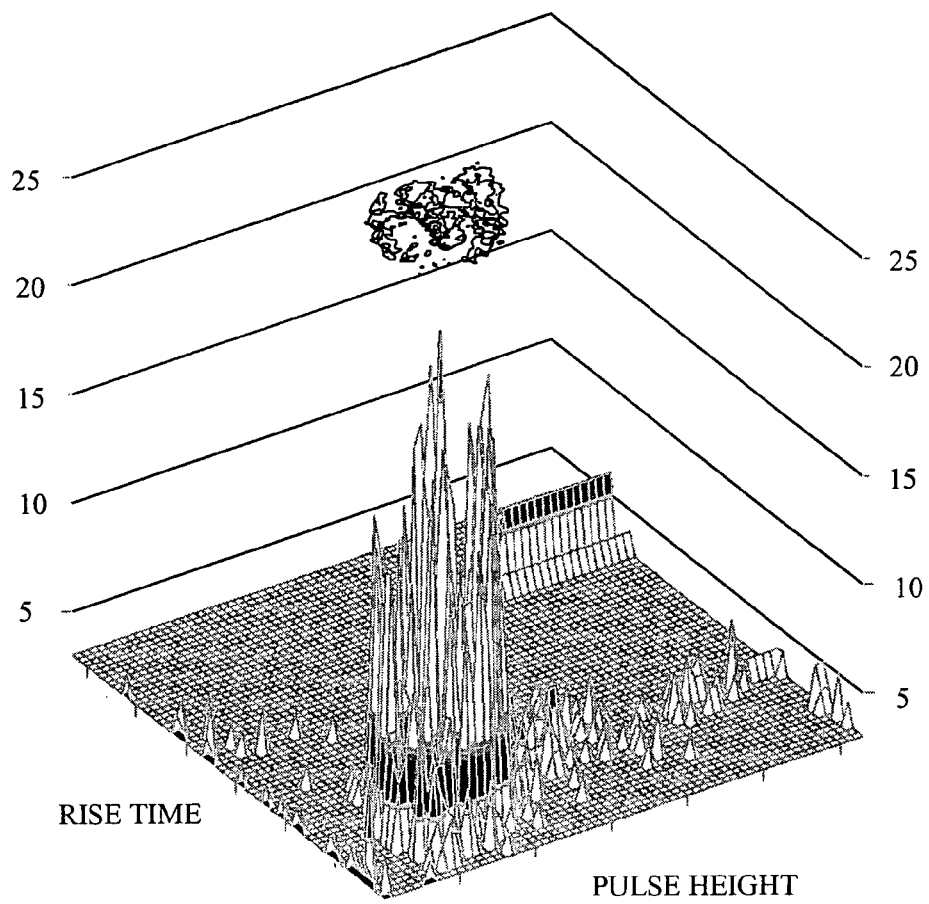
Figure 10C:
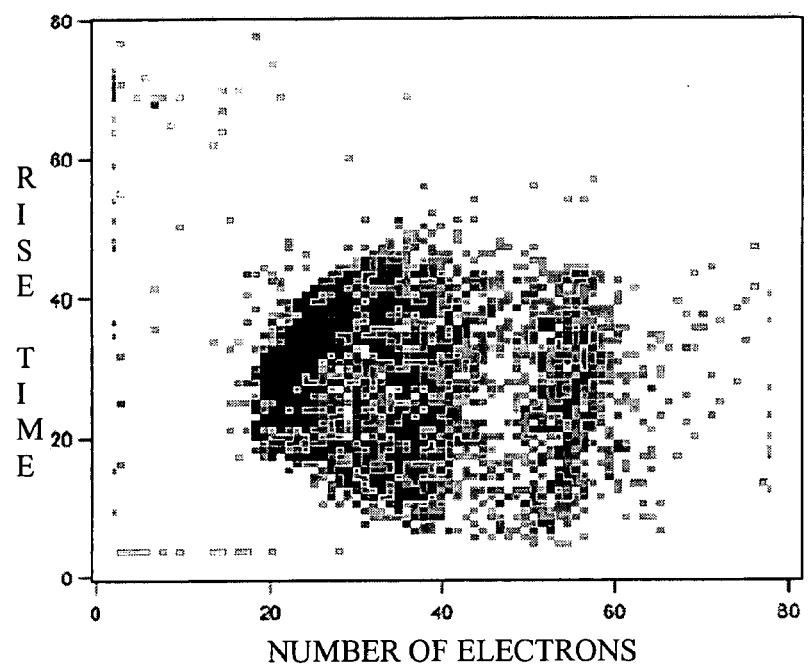
Figure 10D:
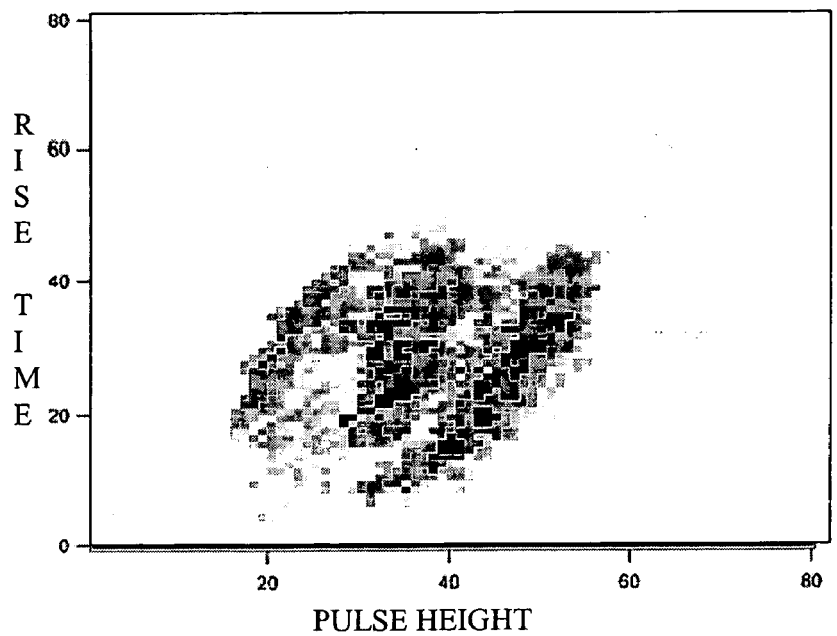

FIG. 10a shows a 3D plot demonstrating the two dimensional number of electrons versus rise time while FIG. 10b shows a similar 3D plot for a two dimensional spectrum of pulse amplitude versus rise time. FIG. 10c is the two-dimensional spectrum corresponding to FIG. 10a while FIG. 10d is the two dimensional spectrum corresponding to FIG. 10b. FIGS. 10c and d are obtained by integrating the risetime dependence out of FIGS. 10a and b respectively. FIGS. 10c and d are the frequency versus energy plots in a form commonly referred to as spectra in the known art.

Figure 11A:
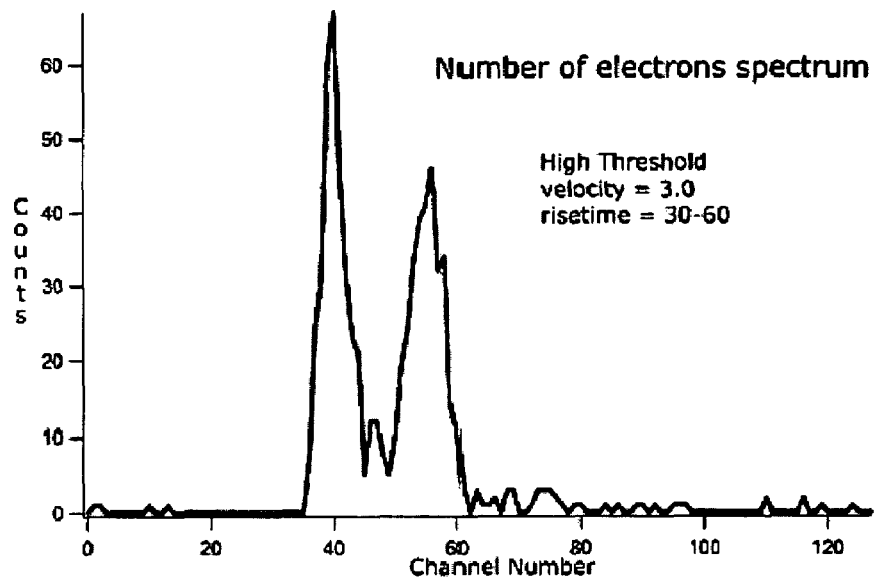
FIGS. 11a–d are graphs of exemplary digitally reconstructed spectra.
Figure 11B:
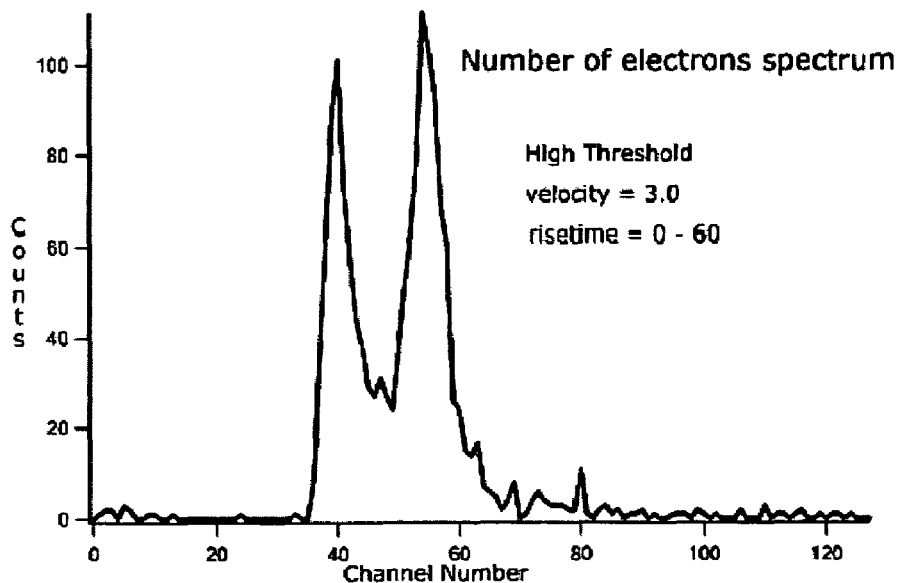

Again returning to FIG. 8, the histogram data is then integrated 826 to provide energy data. Sorting of the histogram data 824 for discrimination of results is selectively accomplished to reduce effects of multiple interaction or pile-up events present in the data. Various detector phenomena can be corrected or discriminated as will be described subsequently. Sorting by rise time has been demonstrated to sharpen data results as will be described subsequently. FIG. 11a is a digital reconstruction of the fit parameter Ne with the number of electrons inducing the charge pulse based on a least squares fit of the pulse as the ordinate. The number of electrons is the closest measure of gamma-ray energy available in the detector. The data in FIG. 11a, is sorted such that only the top 50% of the rise times are summed. The electron velocity parameter was selected at 3.0. The peak to valley is about 8:1 and the resolution is about 10%. FIG. 11b shows the same digitally reconstructed spectra with all rise times included. The resulting peak to valley is about 5:1 and the resolution is similar to FIG. 11a at about 10%.

Figure 11C:
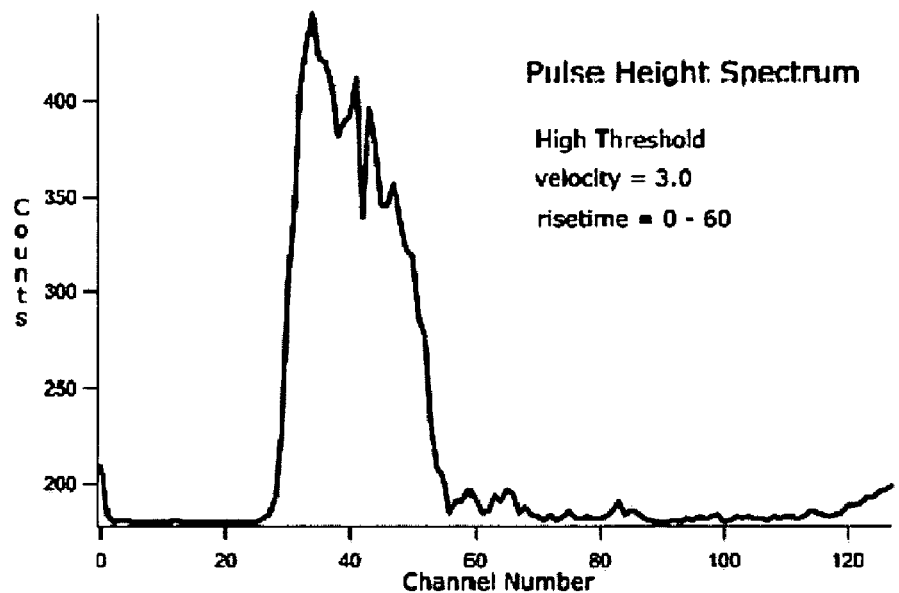
Figure 11D:
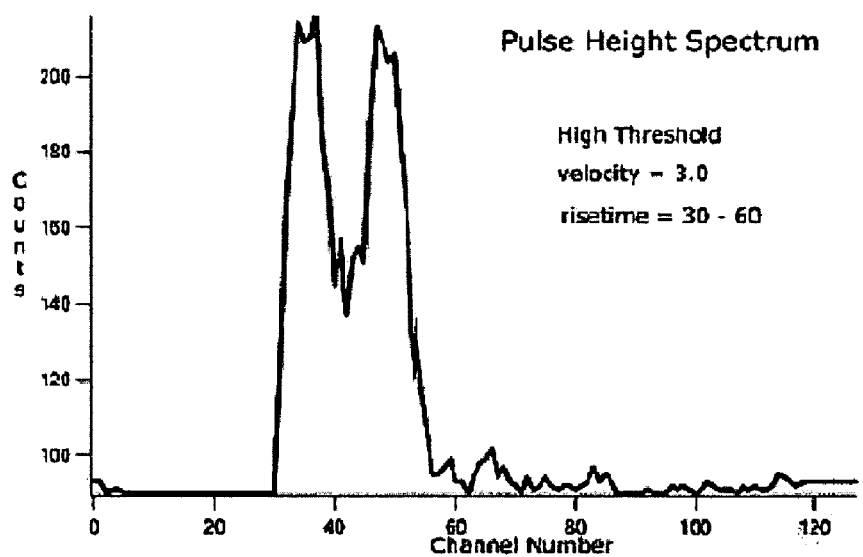

FIG. 11c shows the pulse height spectra reconstruction. The overall pulse height based on the fit is the ordinate. No full-energy peak is visible. This is evidence that for the lower rise times, corresponding to the events nearest the anode, the pulse height is diminished such that it curves under the lower-energy events so badly that the peak disappears. As shown in FIG. 11d, the digital reconstruction for a sorting of the upper 50% of rise times restores the main gamma-ray peak-to valley ratio from 1:1 (no peak) to about 5:1. Furthermore, it restores the peak to valley of the largest 50% of the rise times from 2:1 to 9:1.

Although prior art spectrometer systems provide gamma-ray energy information by eliminating position dependence, the position information provided in the present invention is also useful in refining the data due to several phenomena which are specifically position dependent within the detector. These phenomena are encompassed within the number of events versus energy data shown in FIG. 12.

The first of these is X-Ray escape. Xenon detectors have an "x-ray escape" feature. This feature is caused when the energy of a xenon x-ray is not captured resulting in a misinterpretation of the energy of the gamma-ray. This is shown diagrammatically in FIG. 12 as interaction 1202 and represented by region 1302 in FIG. 13. These events preferentially occur near the cathode or anode because the x-ray is able to escape from these positions. Hence the position information may be used to discriminate in favor of or against these events.

Similarly in Compton Escape, Gamma-ray detectors have a feature where the gamma-rays are misinterpreted as a lower energy due to Compton scattering and the escape of the Compton scattered gamma-ray. The energy of the escape gamma-ray plus the detected gamma-ray energy sums to the actual gamma-ray energy. The high-energy Compton-escape events, or those closest to the photo peak shown in region 1308 of FIG. 13, result from the escape of a low-energy Compton scattered gamma-ray as represented by interaction 1208 in FIG. 12. These events will be preferentially near the surface of the detector. The full energy gamma-rays of this energy will be distributed more uniformly through the detector volume and hence may be discriminated in favor of or against these events.

Figure 13:
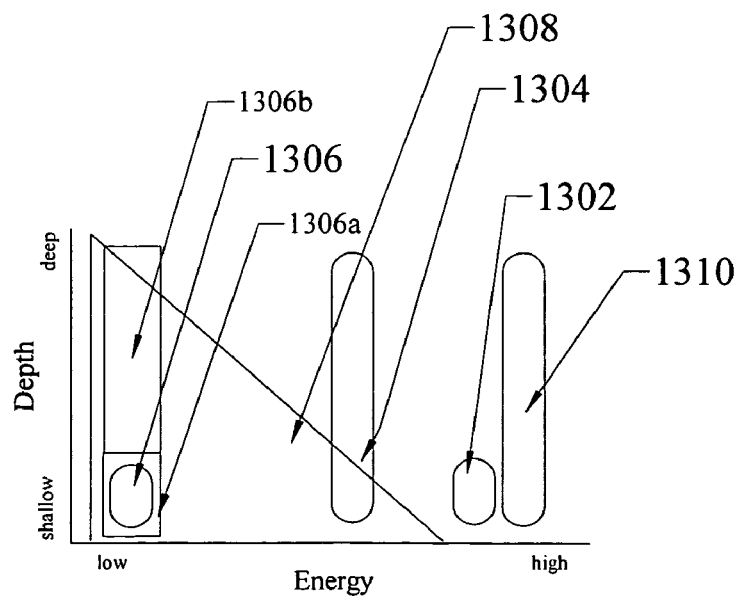
FIG. 13 is a plot of the number of events versus energy for description of the advantages of position information in correcting for particular events; and, FIG. 14 is an exemplary reconstructed spectra weighted for position influenced data.

Low-energy Compton-escape events shown generally in region 1306 of FIG. 13 resulting from high-energy gamma-rays result from the escape of a higher-energy gamma-ray. Low-energy gamma-rays interacting in the detector, interact preferentially near the outside surface of the detector. The escape events are more uniformly distributed through the volume of the detector. Hence the position information may be used to discriminate in favor of or against these events.

It is also probable that other particles, specifically neutrons, may interact in the detector with a different depth profile than gamma-rays. In particular, it has been suggested that doping the detector with He-3 will make it sensitive to neutrons through the charged particle producing reaction of He-3 with a neutron producing a proton and a triton with 768 keV of energy. These interactions will have a different position character than gamma-ray interactions (a much more localized electron ionization cloud) hence may be discriminated in favor of or against these events.

Figure 14:
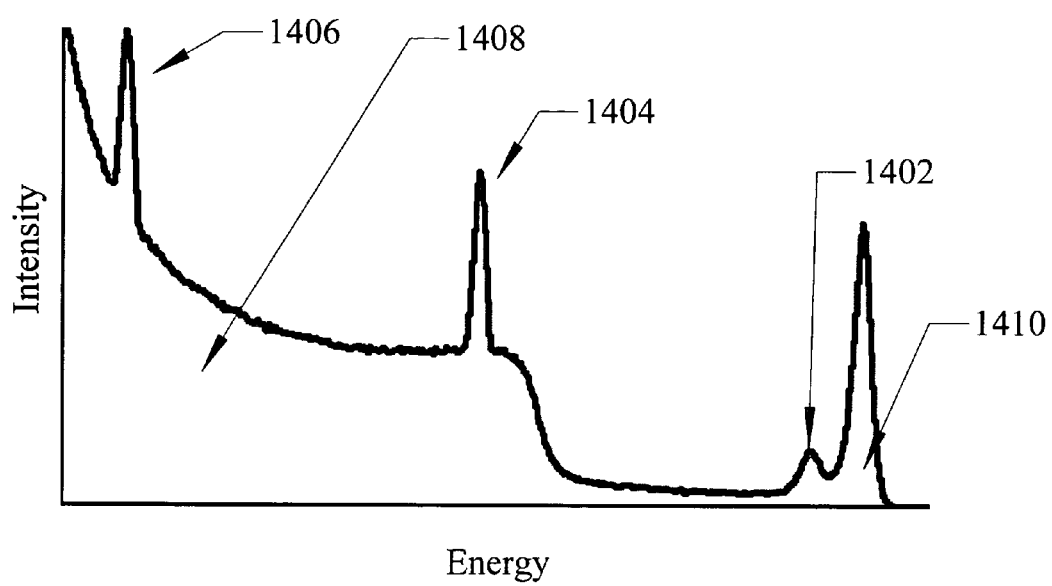

FIG. 14 shows an exemplary spectra in which the data selected for integration has been discriminated in favor of a low energy gamma-ray in the presence of interference caused by Compton scattering which is determined based on the position information available. The discrimination is achieved by utilizing the depth information to ignore interaction depths with low contributions to the effect for which observation is desired in favor of regions with high contribution to those effects. In FIG. 13, region 1306B is ignored and data from region 1306A is emphasized to construct the energy histogram in order to enhance a low energy gamma-ray in a background of Compton scattered interference.

Figure 12:
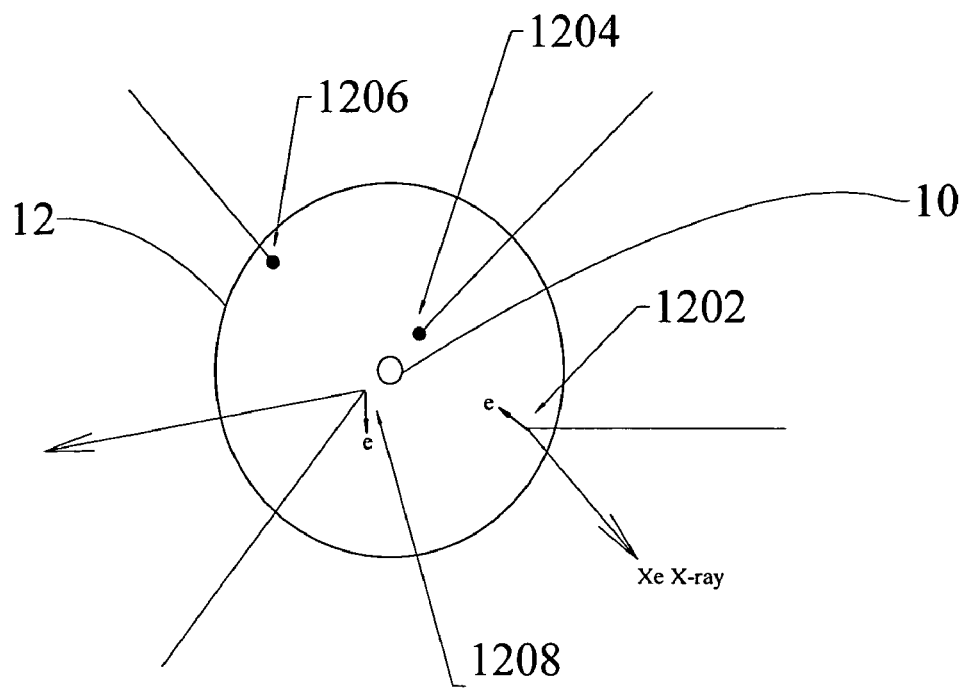
FIG. 12 is a diagrammatic representation of the cross section of the detector showing the relative depth of various radiation interactions.

The peaks in the spectrum of FIG. 14 are associated with the regions of interaction as shown in FIG. 13 wherein peak 1402 corresponds to the X-ray escape events represented by region 1302 in FIG. 13 which in turn, corresponds to the interaction diagrammatically represented as 1202 in FIG. 12. Similarly, the general interactions represented as interaction 1204 and by region 1304 resolve as peak 1404. As previously described, the region 1306A is emphasized in the calculation over regions 1306B to capture the low-energy Compton escape events represented as 1206, resulting in the peak 1406 in the spectrum. The Compton background depicted as 1408 is representative of region 1308 resulting from Compton scattering events represented by 1208 in FIG. 12. Finally, peak 1410 results from region 1310 which is representative of the high energy events occurring at all depths in the detector.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A spectrometer system employing a gridless Xenon detector comprising:
    a detector having
        a pressure vessel containing high pressure Xenon gas,
        an anode supported within the pressure vessel,
        a cathode supported in spaced relation from the anode devoid of structure intermediate the anode and cathode,
        means for creating an electric field between the anode and cathode and maintaining a fixed potential between the anode and cathode including a preamplifier electrically connected to the anode and cathode;
    means for detecting pulses from the preamplifier resulting from charge collection due to radiation ionization of the Xenon gas in the detector; and
    means for parameterization of the detected pulses by comparison to a mathematical model to extract gamma-ray interaction information including energy and position.

2. A spectrometer system as defined in claim 1 wherein the means for parameterization comprises:
    computation means connected to the means for detecting pulses, said computation means having
        means for storing a plurality of detected pulses,
        means operatively connected to the storing means for fitting a curve to each detected pulse to create a fitted waveform,
        second means for storing the fitted waveforms,
        means for categorizing the fitted waveforms to create histogram data,
        means for integrating the histogram data to provide radiation energy data.

3. A spectrometer system as defined in claim 2 further comprising means for displaying the histogram data.

4. A spectrometer system as defined in claim 2 further comprising means for displaying the radiation energy data.

5. A spectrometer system as defined in claim 2 wherein the means for categorizing comprises means for creating histogram data of frequency versus rise time versus number of electrons.

6. A spectrometer system as defined in claim 2 wherein the means for categorizing comprises means for creating histogram data of frequency versus rise time versus pulse height.

7. A spectrometer system as defined in claim 2 wherein the means for integrating includes means for sorting the histogram data.

8. A spectrometer system as defined in claim 2 wherein the computation means further comprises means for entering a predetermined number of pulses to be read.

9. A spectrometer system as defined in claim 2 wherein the computation means further comprises means for entering a predetermined number of waveshapes to be histogrammed.

10. A spectrometer system as defined in claim 2 wherein the means for fitting a curve includes means for inputting electron velocity as a predetermined parameter.

11. A spectrometer system as defined in claim 2 wherein the means for integrating is controllable to discriminate based on position.

* * * * *